US012473778B2

(12) United States Patent
Fiebig et al.

(10) Patent No.: US 12,473,778 B2
(45) Date of Patent: Nov. 18, 2025

(54) MOTORIZED WINDOW TREATMENT

(71) Applicant: Lutron Technology Company LLC, Coopersburg, PA (US)

(72) Inventors: Charles Fiebig, Frenchtown, NJ (US); Randy C. Seiple, Nazareth, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 204 days.

(21) Appl. No.: 17/988,272

(22) Filed: Nov. 16, 2022

(65) Prior Publication Data

US 2023/0151682 A1 May 18, 2023

Related U.S. Application Data

(60) Provisional application No. 63/264,136, filed on Nov. 16, 2021.

(51) Int. Cl.
*E06B 9/266* (2006.01)

(52) U.S. Cl.
CPC .................................... *E06B 9/266* (2013.01)

(58) Field of Classification Search
CPC ............ E06B 9/266; E06B 9/32; E06B 9/323; E06B 9/322; E06B 9/42; E06B 9/56; E06B 2009/2625; E06B 2009/2627
See application file for complete search history.

(56) References Cited

U.S. PATENT DOCUMENTS 3,169,006 A * 2/1965 Lorentzen ............... E06B 9/323 248/262
8,851,141 B2 10/2014 Blair et al.
8,950,461 B2 2/2015 Ogden et al.
9,045,939 B2 6/2015 Blair et al.
9,810,020 B2 11/2017 Adams et al.
2001/0050538 A1* 12/2001 Kovach ..................... E06B 9/32 318/16
2003/0221794 A1* 12/2003 Morris ..................... A47H 2/00 248/223.41
2004/0221970 A1* 11/2004 Nien ....................... E06B 9/323 160/173 R
2004/0226662 A1* 11/2004 Tyner ...................... E06B 9/324 160/84.04
2005/0109902 A1* 5/2005 Wolfe ..................... E06B 9/266 248/262

(Continued)

*Primary Examiner* — Abe Massad
*Assistant Examiner* — Matthew R. Shepherd
(74) *Attorney, Agent, or Firm* — Flaster Greenberg PC

(57) ABSTRACT

A motorized window treatment may include a covering material, a motor drive unit, a headrail, a cover, and one or more mounting brackets. The cover may be configured to enclose at least an upper portion and a rear portion of the headrail. The mounting brackets may be configured to secure the motorized window treatment to a structure. The mounting brackets may include a biasing member that is configured to engage a lower lip of the cover to bias the respective mounting bracket toward the top plate of the cover. The mounting brackets may include a release button that is configured to extend through a gap between the headrail and the top plate of the cover. The release button may be configured to be operated to adjust the motorized window treatment into a service position in which access is provided to at least one battery within the headrail.

24 Claims, 13 Drawing Sheets

(56) References Cited

U.S. PATENT DOCUMENTS

| | | | | |
|---|---|---|---|---|
| 2006/0021718 | A1* | 2/2006 | Franssen | E06B 9/323 160/178.1 R |
| 2007/0000621 | A1* | 1/2007 | Drew | E06B 9/323 160/178.1 R |
| 2007/0089841 | A1* | 4/2007 | Rossato | E06B 9/323 160/178.1 R |
| 2007/0144682 | A1* | 6/2007 | Drew | E06B 9/323 160/23.1 |
| 2010/0263811 | A1* | 10/2010 | Gao | E06B 9/266 160/368.1 |
| 2012/0090797 | A1 | 4/2012 | Mullet et al. | |
| 2013/0153162 | A1 | 6/2013 | Blair et al. | |
| 2015/0226601 | A1 | 8/2015 | Perrea et al. | |
| 2016/0123076 | A1* | 5/2016 | Kirby | E06B 9/42 160/310 |
| 2017/0204659 | A1* | 7/2017 | Marcinik | E06B 9/50 |
| 2017/0288350 | A1 | 10/2017 | Andersen et al. | |

* cited by examiner

MOTORIZED WINDOW TREATMENT

CROSS-REFERENCE TO RELATED APPLICATIONS

This application claims the benefit of Provisional U.S. Patent Application No. 63/264,136, filed Nov. 16, 2021, the entire disclosure of which is hereby incorporated by reference herein in its entirety.

BACKGROUND

A window treatment may be mounted in front of one or more windows, for example to prevent sunlight from entering a space and/or to provide privacy. Window treatments may include, for example, roller shades, roman shades, cellular shades, venetian blinds, or draperies. A roller shade may typically include a flexible shade fabric wound onto an elongated roller tube. A venetian blind may comprise a number of slats spaced apart vertically between a headrail and a bottom bar. A cellular shade may comprise a cellular fabric extending between a headrail and a bottom bar located at a lower end of the cellular fabric. The headrails of venetian blinds and cellular shades may be mounted to a structure surrounding the window by one or more mounting brackets.

Venetian blinds and cellular shades may comprise mechanisms for raising and lowering the bottom bar. For example, the venetian blinds and cellular shades may comprise one or more lift cords that extend from the headrail to the bottom bar for lifting the bottom bar. In addition, the headrails of the venetian blinds and cellular shades may each comprise a drive shaft coupled to one or more spools around which the lift cords are wound. For example, the drive shaft may be rotated in first and second directions to wind and unwind the lift cords to thus raise and lower the bottom bar, respectively.

Such a window treatment may be motorized. For example, a motorized window treatment may include a motor drive unit configured to rotate the drive shaft to raise and lower the bottom bar. In addition, the motorized window treatment may comprise one or more batteries for powering the motor drive unit and/or electrical wiring coupled to an external power source for powering the motor drive unit. The components of the motorized window treatment, such as the headrail, the brackets, the motor drive unit, the batteries, and/or the electrical wiring may be concealed by a fascia or installed in a pocket out of view.

SUMMARY

As described herein, a motorized window treatment may include a covering material, a motor drive unit, a headrail, a cover, and one or more mounting brackets. The motor drive unit may be adapted to control the covering material between a fully-raised and a fully-lowered position. The headrail may be configured to enclose the motor drive unit. The covering material may be configured to descend from the headrail when operated from the fully-raised to the fully-lowered position. The headrail may include a battery holder for receiving at least one battery for powering the motor drive unit. The cover may be elongate between a first end of the headrail and the second end of the headrail. The cover may include a rear plate and a top plate extending substantially perpendicular to the rear plate. The cover may be configured to enclose at least an upper portion and a rear portion of the headrail. The top plate may be configured to extend over the upper portion of the headrail when the headrail is attached to the mounting bracket(s). The top plate may comprise a plurality of ribs extending from an inner surface of the top plate. The plurality of ribs may extend substantially parallel to the rear plate. The cover may include a front lip that extends at an angle from the top plate. The motorized window treatment may include end covers that cover the first and second ends of the head rail.

The headrail may include a front portion that is removably attachable thereto. The front portion may include an upper clip configured to engage an upper surface of the headrail. The front portion may further include an intermediate clip configured to engage a channel defined by the headrail. The upper clip and the intermediate clip may be configured to resist a threshold force applied to the front portion in a direction away from the headrail. The intermediate clip may define a T-shaped cross-section.

The cover may be metallic (e.g., at least partially metallic). The cover may define a notch. The cover may comprise a non-metallic plate that is configured to be secured within the notch. The notch and the non-metallic plate may be configured to enable wireless messages to be received by the motorized window treatment. For example, the motorized window treatment may include a wireless communication circuit that is configured to receive the wireless messages. The wireless messages may include one or more commands for controlling the motorized window treatment. The mounting brackets may be configured to secure the motorized window treatment to a structure. The mounting brackets may include a biasing member and a release button. The biasing member may be configured to engage a lower lip of the cover to bias the respective mounting bracket toward the top plate of the cover. The biasing member may be configured to wedge the respective mounting bracket between the lower lip and one or more of the plurality of ribs such that the respective mounting bracket is removably attached to the cover without the use of fasteners. The mounting brackets may be configured to receive fasteners that extend through the cover and into the structure for mounting the motorized window treatment to the structure. At least a portion of the biasing member may extend beyond a lower edge of the mounting bracket. The biasing member may include an arm that extends from a rear sheet of the mounting bracket. The biasing member may further include a curved portion that is curved away from a plane defined by the rear sheet. The biasing member may further include a tip that is configured to abut the lower lip of the cover. The mounting bracket may include a pair of links that connect the biasing member to the rear sheet. The mounting bracket may further include slots on opposed sides of the biasing member. The slots may be configured to enable relative movement of the biasing member with respect to the rear sheet.

The mounting brackets may further include a release button configured to extend through a gap between the headrail and the top plate of the cover when the motorized window treatment is in an operating position. The gap may be defined between a front portion of the headrail and the front lip of the cover. A width of the gap may be maintained substantially constant along a length of the motorized window treatment, for example, by the biasing member biasing the mounting bracket against the top plate. The release button may be configured to be operated to adjust the motorized window treatment into a service position in which access is provided to the at least one battery. The release button may be configured to be pushed towards the rear plate to release the motorized window treatment from the operating position. The mounting brackets may remain coupled to the cover and the headrail may remain attached to the mounting brackets when the motorized window treatment is in the service position. The mounting brackets may include a latch that is coupled to the release button. The latch may be configured to secure the motorized window treatment in the operating position.

DETAILED DESCRIPTION

Figure 1:
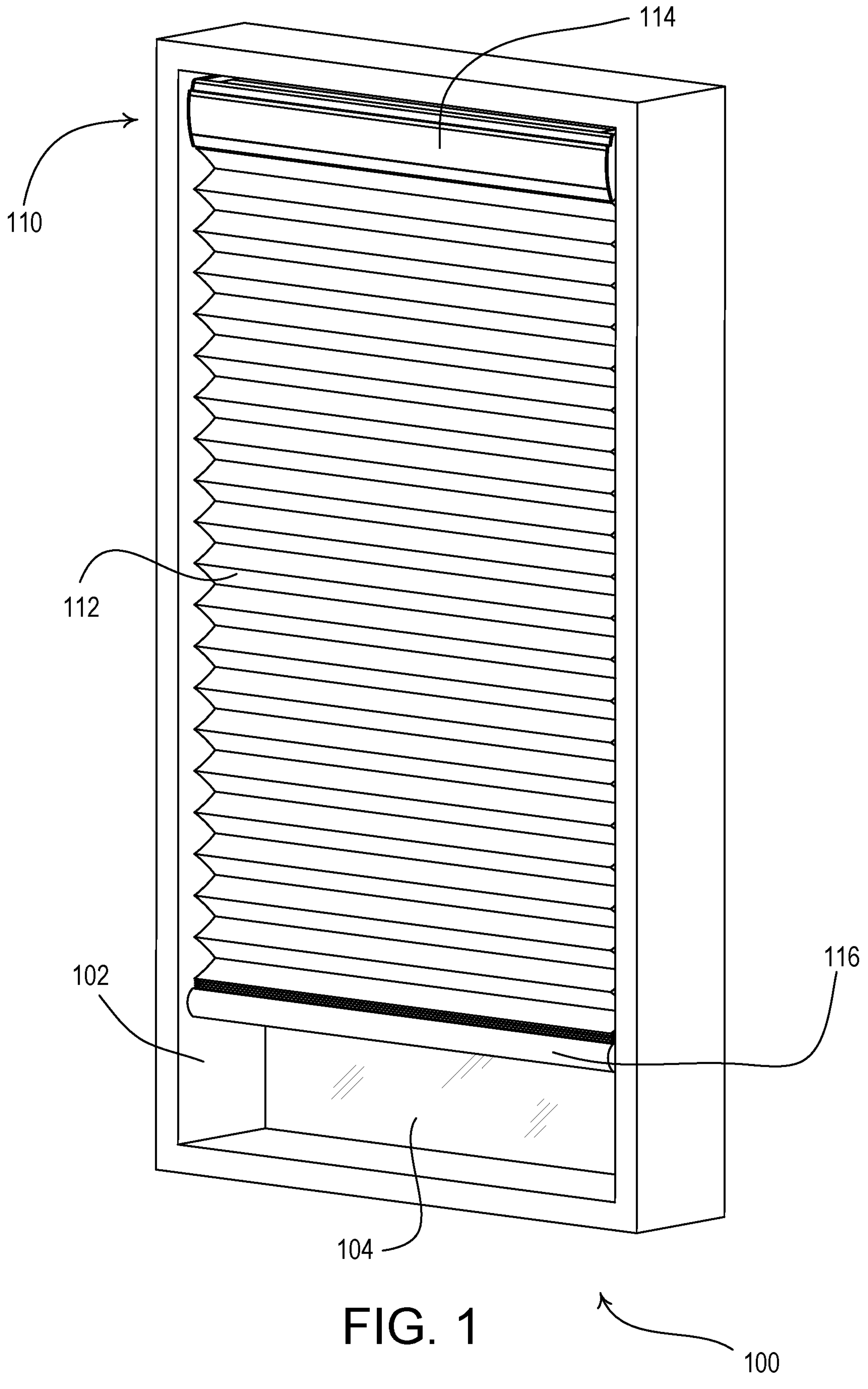
FIG. 1 is a perspective view of a motorized window treatment system having a battery-powered motorized window treatment.

FIG. 1 is a perspective view of a motorized window treatment system 100 having a battery-powered motorized window treatment 110 mounted in an opening 102, for example, in front of a window 104. The battery-powered motorized window treatment 110 comprises a covering material 112, for example, a cellular shade fabric as shown in FIG. 1. For example, the covering material 112 may comprise a plurality of cells that are formed when two sheets of fabric are attached to each other. The cells of the covering material 112 may extend horizontally across the width of the covering material 112. The covering material 112 has a top end connected to a headrail 114 (e.g., via upper plate 123 shown in FIG. 7) and a bottom end connected to a bottom bar 116 (e.g., via lower plate 121 shown in FIG. 7). The bottom bar 116 may be a weighted bar (e.g., a hembar) attached to the bottom end of the covering material 112. The covering material 112 may hang in front of the window 104, and may be adjusted between a fully-raised position $P_{FULLY\text{-}RAISED}$ (e.g., a fully-open position) and a fully-lowered position $P_{FULLY\text{-}LOWERED}$ (e.g., a fully-closed position) to control the amount of daylight entering a room or space. The cells of the covering material 112 may successively expand and contract when the covering material 112 is operated between the fully-raised position and the fully-lowered position. Alternatively, the battery-powered motorized window treatment 110 could be mounted externally to the opening 102 (e.g., above the opening) with the covering material 112 hanging in front of the opening and the window 104. In addition, the battery-powered motorized window treatment 110 could alternatively comprise other types of covering materials, such as, for example, a plurality of horizontally-extending slats (e.g., a Venetian or Persian blind system), pleated blinds, a roller shade fabric, or a Roman shade fabric.

Figure 2:
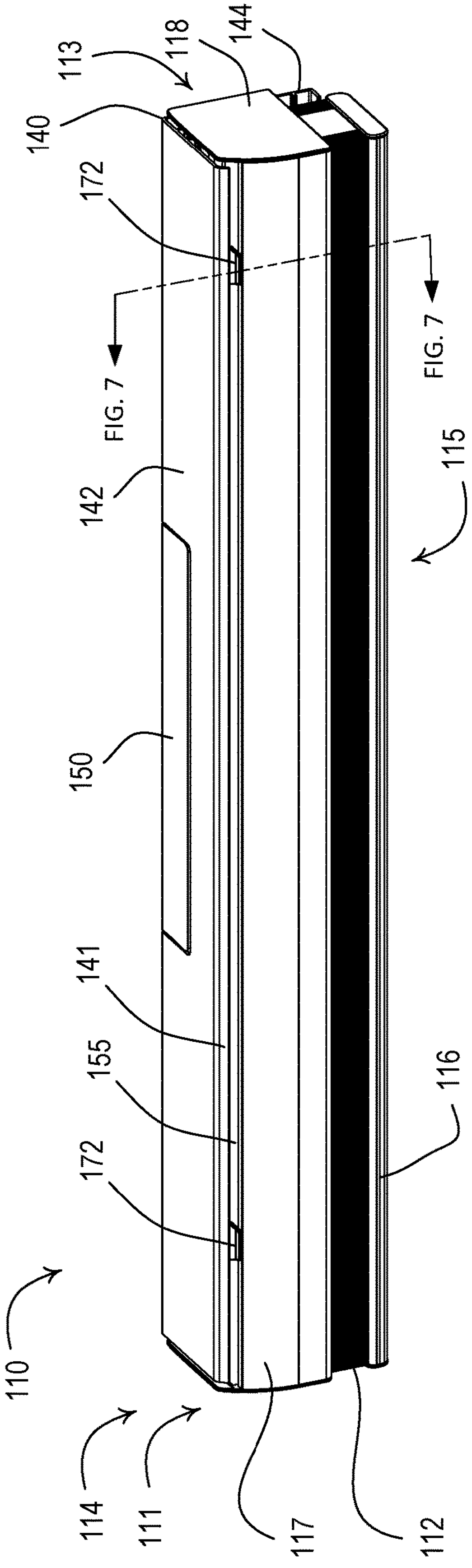
FIG. 2 is a top perspective view and FIG. 3 is a bottom perspective view of the battery-powered motorized window treatment of FIG. 1 with a cellular shade fabric in a fully-raised position.
Figure 3:
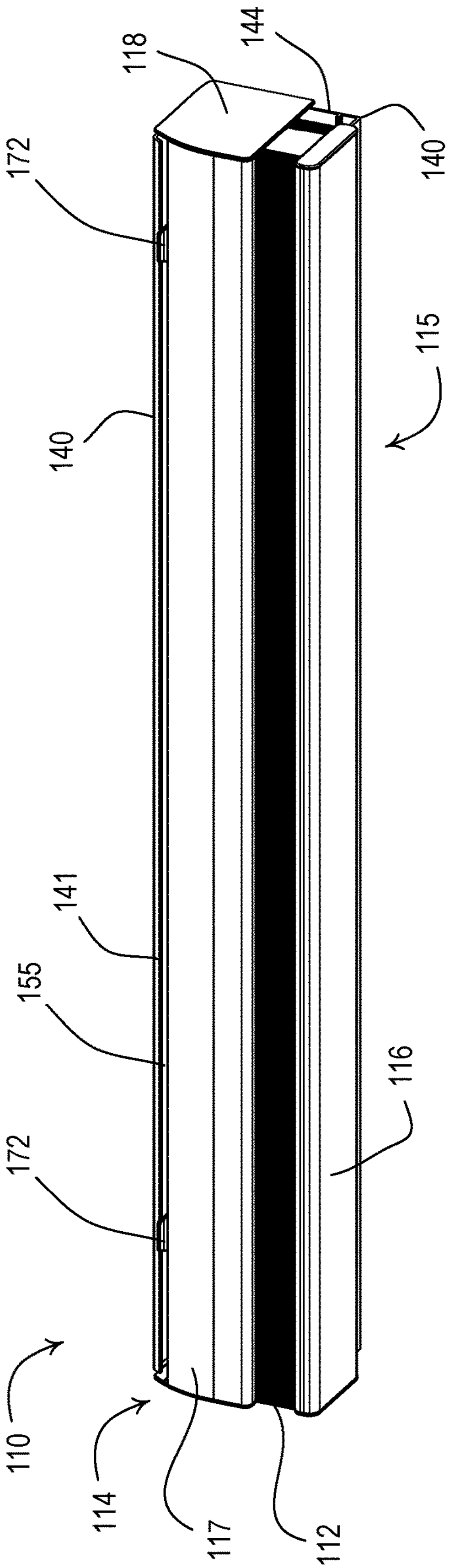
Figure 4:
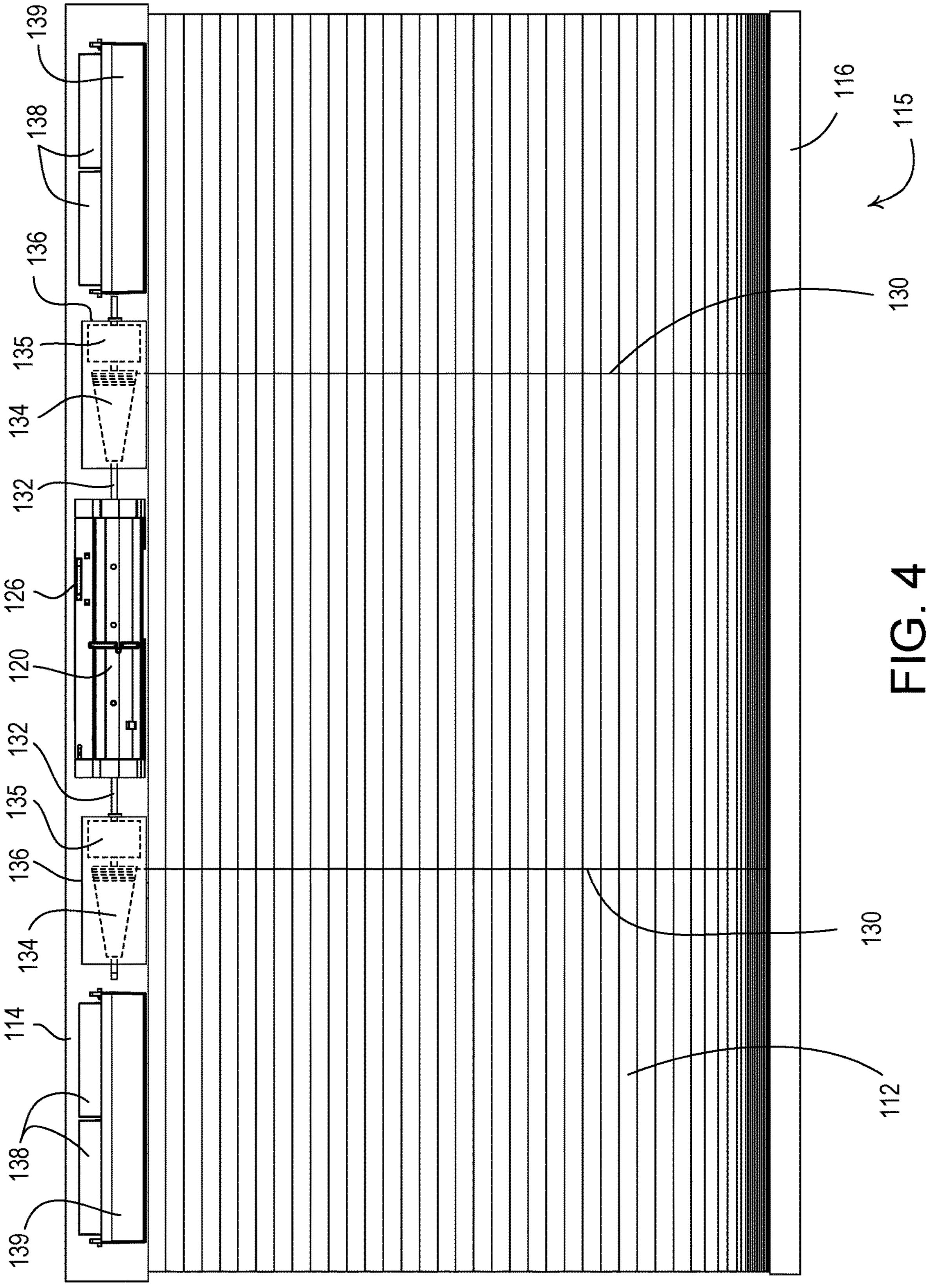
FIG. 4 is a front view of the battery-powered motorized window treatment of FIG. 1 with a front portion of a headrail removed and the cellular shade fabric in a lowered position.

FIG. 2 is a top perspective view and FIG. 3 is a bottom perspective view of the battery-powered motorized window treatment 110 with the covering material 112 in the fully-raised position $P_{FULLY\text{-}RAISED}$. FIG. 4 is a front view of the battery-powered motorized window treatment 110 with a front portion 117 of the headrail 114 removed and the covering material 112 in a lowered position (e.g., a partially-lowered position or the fully-lowered position $P_{FULLY\text{-}LOWERED}$).

The motorized window treatment 110 may comprise a motor drive unit 120 for raising and lowering the bottom bar 116 and the covering material 112 between the fully-raised position $P_{FULLY\text{-}RAISED}$ and the fully-lowered position $P_{FULLY\text{-}LOWERED}$. By controlling the amount of the window 104 being covered by the covering material 112, the motorized window treatment 110 is able to control the amount of daylight entering the room. The headrail 114 of the motorized window treatment 110 may comprise an internal side 122 and an opposite external side 124, which faces the window 104 that the covering material 112 is covering. The motor drive unit 120 may comprise a drive unit button 126, which may be positioned adjacent the internal side 122 of the headrail 114 and may be actuated when a user is configuring the motorized window treatment 110. The drive unit button 126 may be made of, for example, a clear material, such that the drive unit button may operate as a light pipe to conduct illumination from inside the motor drive unit 120 to thus be provide feedback to the user of the motorized window treatment 110.

The motorized window treatment 110 may comprise lift cords 130 that extend from the headrail 114 to the bottom bar 116 for allowing the motor drive unit 120 to raise and lower the bottom bar (e.g., control the covering material between the fully-raised position and fully-lowered position). The motor drive unit 120 may include an internal motor 150 that may be coupled to drive shafts 132 that extend from the motor drive unit 120 on each side of the motor drive unit 120 and are each coupled to a respective lift cord spool 134. The lift cords 130 may be windingly received around the lift cord spools 134 and fixedly attached to the bottom bar 116, such that the motor drive unit 120 is able to rotate the drive shafts 132 to raise and lower the weighting element. The motorized window treatment 110 may further comprise two constant-force spring assist assemblies 135, which are each coupled to the drive shafts 132 adjacent to one of the two lift cord spools 134. Each of the lift cord spools 134 and the adjacent constant-force spring assist assembly 135 may be housed in a respective lift cord spool enclosure 136 as shown in FIG. 4. Alternatively, the motor drive unit 120 could be located at either end of the headrail 114 and the motorized window treatment 110 could comprise a single drive shaft that extends along the length of the headrail and is coupled to both of the lift cord spools 134.

The battery-powered motorized window treatment 110 may also comprise a plurality of batteries 138 (e.g., four D-cell batteries), which may be electrically coupled in series. The series-combination of the batteries 138 may be electrically coupled to the motor drive unit 120 for powering the motor drive unit 120. The batteries 138 may be housed inside the headrail 114 and thus out of view of a user of the motorized window treatment 110. Specifically, the batteries 138 may be mounted in two battery holders 139 located inside the headrail 114, such that there are two batteries in each battery holder as shown in FIG. 4. Alternatively, the motor drive unit 120 could comprise more batteries (e.g., six or eight) coupled in series or batteries of a different kind (e.g., AA batteries) coupled in series.

The battery-powered motorized window treatment 110 may comprise a cover 140. The cover 140 may be elongate between a first end 111 of the headrail 114 and a second end 113 of the headrail 114. The cover 140 may be configured to enclose at least a portion of the headrail 114. The cover 140 may be metallic (e.g., at least partially metallic). The cover 140 may comprise a top plate 142 and a rear plate 144. The top plate 142 may extend substantially perpendicular to the rear plate 144. The top plate 142 may be configured to extend over an upper portion of the headrail 114. The rear plate 144 may be configured to extend over a rear portion of the headrail 114. The rear portion of the headrail may face the structure. The cover 140 (e.g., the top plate 142) may comprise a front lip 141. The front lip 141 may be distal from the rear plate 144. The front lip 141 may extend at an angle from the top plate 142. The front lip 141 may define a curved cross-section that is configured to be angled toward the headrail 114, for example, when the headrail 114 is coupled to the cover 140.

The battery-powered motorized window treatment 110 may comprise end covers 118. The end covers 118 may be configured to be removably attached to respective ends of the headrail 114. The end covers 118 may be configured to enclose openings at the respective ends of the headrail 114.

The battery-powered motorized window treatment 110 may comprise a shade assembly 115. The shade assembly 115 may comprise the headrail 114, the covering material 112, the motor drive unit 120, the drive unit button 126, the batteries 138, the battery holder(s) 139, the lift cord(s) 130, the lift cord spool(s) 134, the lift cord spool enclosure(s) 136, the drive shafts 132, the bottom bar 116, and/or the end covers 118.

The battery-powered motorized window treatment 110 may comprise one or more release buttons 172. The release buttons 172 may be configured to be operated to adjust the battery-powered motorized window treatment 110 (e.g., the shade assembly 115) into a service position, for example, from an operating position. For example, the headrail 114 may be pulled away from the cover 140 to operate the shade assembly 115 into the service position. When the battery-powered motorized window treatment 110 (e.g., the shade assembly 115) is in the service position, access may be provided to at least one of the plurality of batteries 138. For example, one or more of the battery holders 139 may be accessible when the battery-powered motorized window treatment 110 (e.g., the shade assembly 115) is in the service position. The plurality of batteries 138 may be inaccessible when the battery-powered motorized window treatment 110 (e.g., the shade assembly 115) is in the operating position. The release buttons 172 may extend through a gap 155 between the cover 140 and the headrail 114. For example, the release buttons 172 may extend through the gap 155 between the top plate 142 and the headrail 14 when the shade assembly 115 is in the operating position. The release buttons 172 may be configured to be pushed towards the rear plate 144 to release the battery-powered motorized window treatment 110 (e.g., the shade assembly 115) from the operating position. The gap 155 may be defined by the front portion 117 of the headrail 114 and the front lip 141 of the cover 140. The front portion 117 of the headrail 114 may be a plate that is removably attachable thereto. The release buttons 172 extending through the gap 155 may provide a simple and reliable release mechanism to release the battery-powered motorized window treatment 110 from the operating position to the service position, for example, to change one or more of the batteries 138 and/or access other components housed within the headrail 114.

Figure 5:
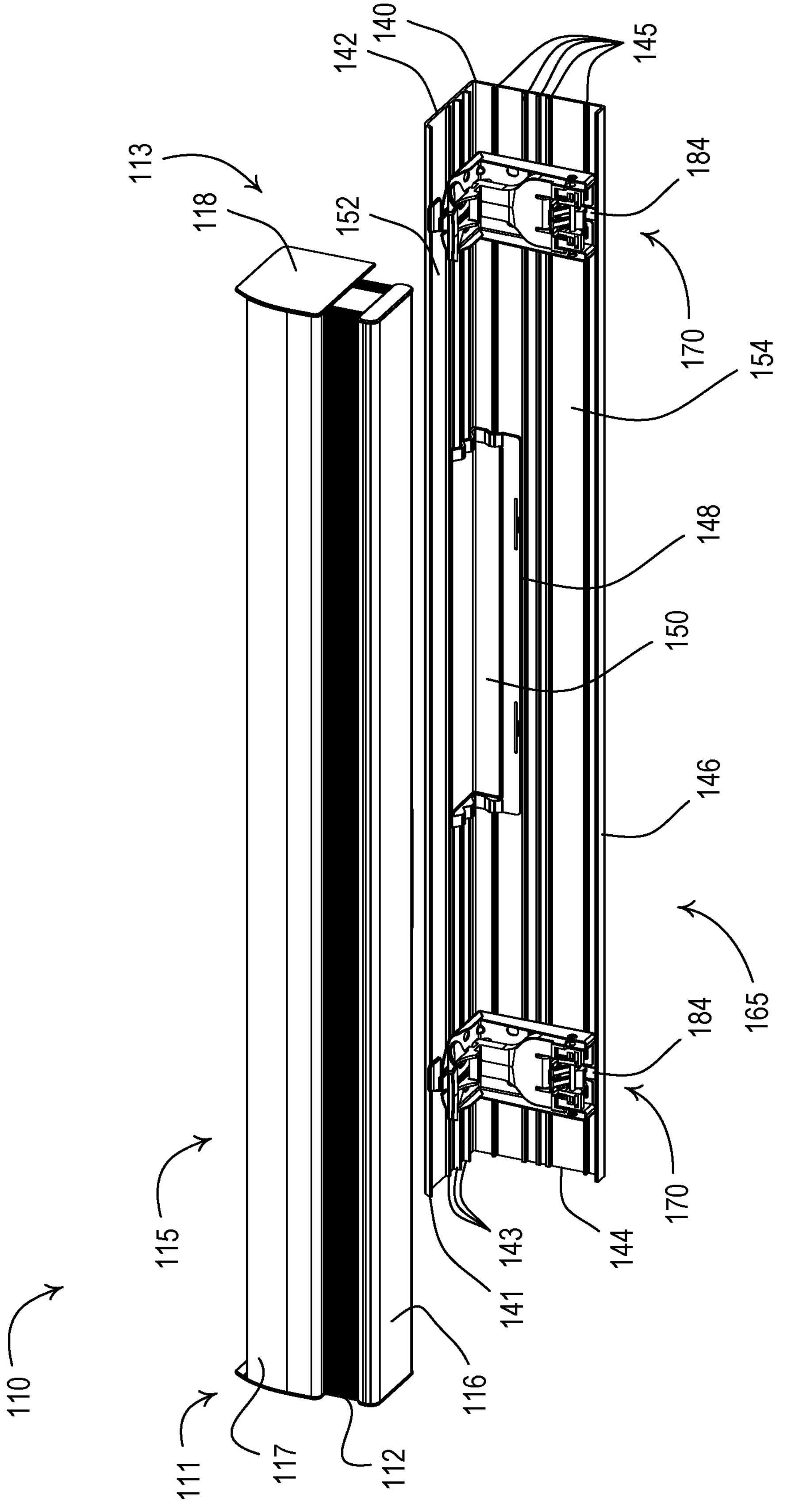
FIG. 5 is a partially exploded view of the battery-powered motorized window treatment of FIG. 1 showing a shade assembly detached from mounting brackets.
Figure 6:
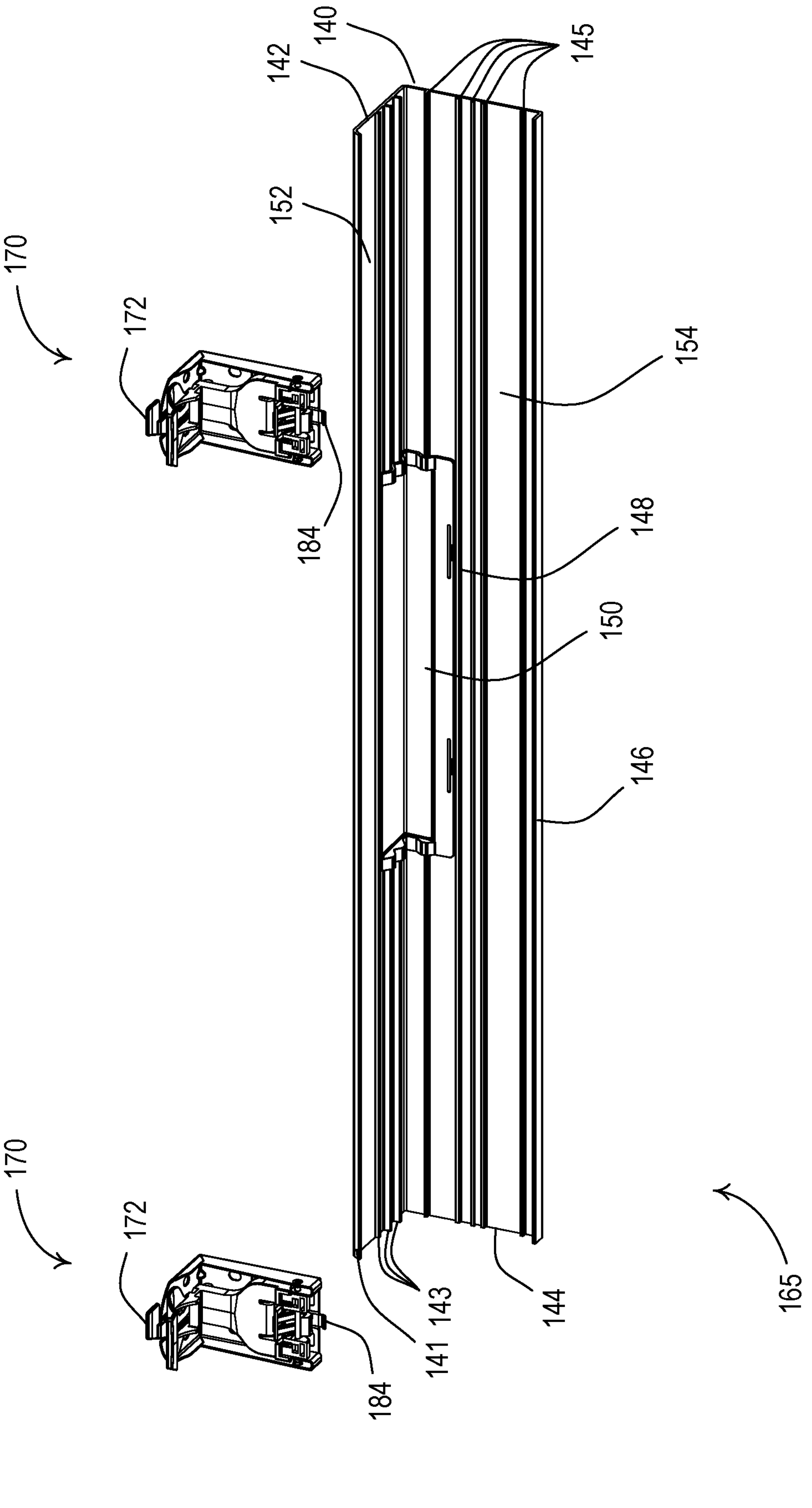
FIG. 6 is a partially exploded view of the battery-powered motorized window treatment of FIG. 1 showing the mounting brackets detached from the cover.
Figure 7:
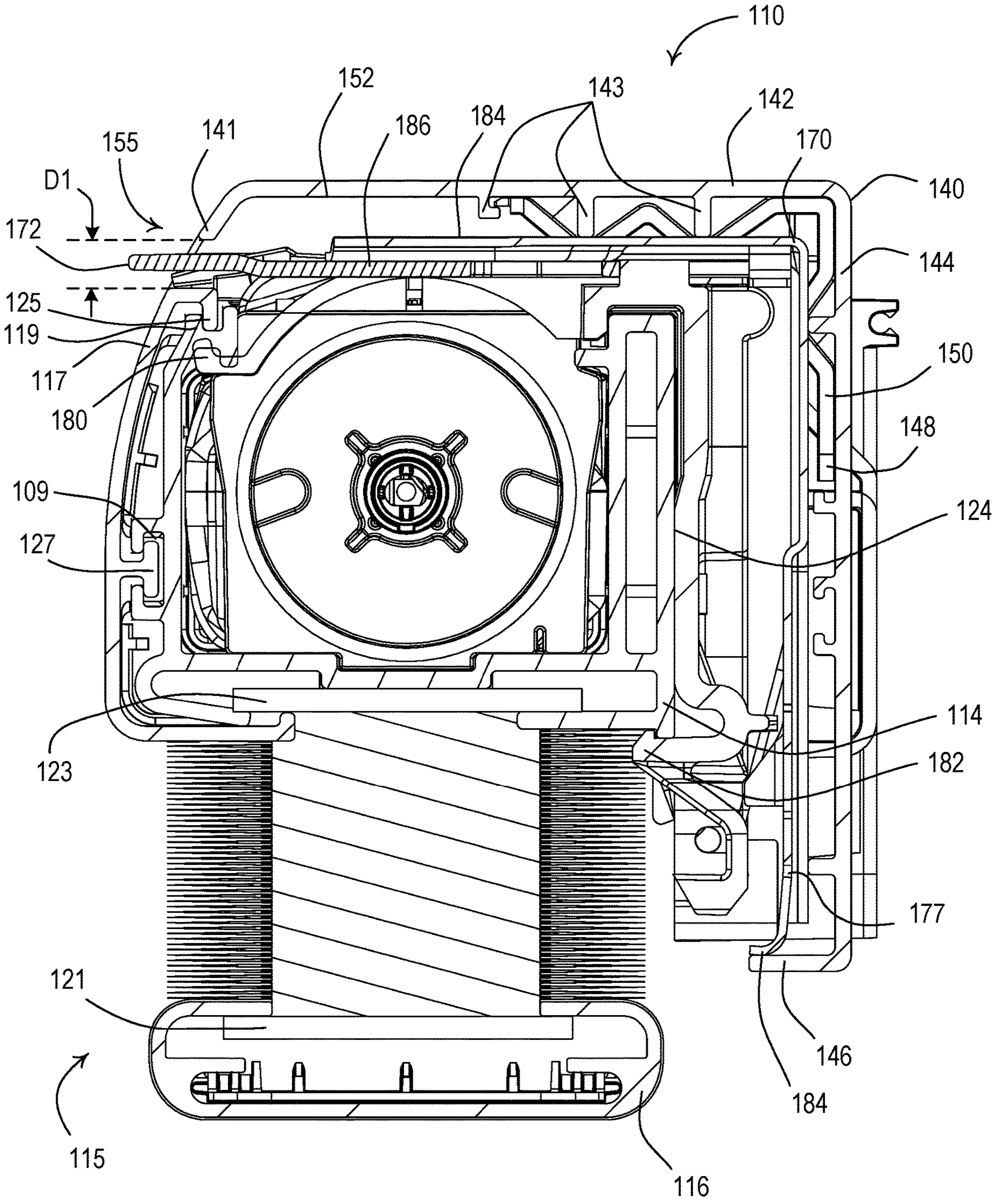
FIG. 7 is a cross-section view of the battery-powered motorized window treatment of FIG. 1 taken through one of the mounting brackets.

FIG. 5 is a partially exploded view of the battery-powered motorized window treatment 110 showing the shade assembly 115 detached from mounting brackets 170 of a mounting assembly 165. FIG. 6 is a partially exploded view of the mounting assembly 165 with the mounting brackets 170 detached from the cover 140. FIG. 7 is a cross-section view of the battery powered motorized window treatment 110 taken through one of the mounting brackets 170. The battery-powered motorized window treatment 110 may comprise two or more of the mounting brackets 170. For example, the battery-powered motorized window treatment 110 may comprise a mounting assembly 165. The mounting assembly 165 may be configured to secure the shade assembly 115 to a structure. The mounting assembly 165 may comprise the mounting brackets 170 and the cover 140. The mounting brackets 170 may be configured to secure the battery-powered motorized window treatment 110 to a structure (e.g., through the cover 140). The shade assembly 115 (e.g., the headrail 114) may be configured to be coupled to the mounting brackets 170.

The shade assembly 115 may include a lower plate 121 attached to a lower portion of the covering material 112 and an upper plate 123 attached to an upper portion of the covering material 112. The lower plate 121 may be captively secured within the bottom bar 116, for example, to secure the covering material 112 to the bottom bar 116. The upper plate 123 may be captively secured within the headrail 114, for example, to secure the covering material 112 to the headrail 114. The lower plate 121 and the upper plate 123 may be rigid strips of plastic that are inserted into top and bottom cells of the covering material 112 to connect the covering material 112 to the headrail 114 and the bottom bar 116, respectively.

The front portion 117 may comprise features to engage the headrail 114 such that the front portion 117 is removably secured to the headrail. The front portion 117 may define an upper clip 125 that is configured to engage an upper surface 119 of the headrail 114. The front portion 117 may define an intermediate clip 127 that is configured to engage a channel 109 defined by the headrail 114. The intermediate clip 127 may have a T-shaped cross-section, for example, as shown in FIG. 7. The upper clip 125, the intermediate clip 127, the upper surface 119, and/or the channel 109 may extend from the first end 111 of the headrail 114 to the second end 113 of the headrail 114. It should be appreciated that these features are not limited to this geometry. For example, one or more of the upper clip 125, the intermediate clip 127, the upper surface 119, and/or the channel 109 may be discontinuous between the first end 111 of the headrail 114 and the second end 113 of the headrail 114. The intermediate clip 127 and the upper clip 125 may prevent the front portion 117 from becoming detached from the headrail 114. For example, the intermediate clip 127 and the upper clip 125 may be configured to resist a threshold force that is applied to the front portion 117 in a direction away from the headrail 114.

Each of the mounting brackets 170 may be configured to be coupled to the cover 140. For example, the mounting bracket 170 may be configured to be removably attached to the cover 140 without the user of fasteners. The cover 140 may define a lower lip 146 that extends along a lower edge of the rear plate 144. The lower lip 146 may extend from the rear plate 144 in the same direction as the top plate 142 extends from the rear plate 144. For example, the lower lip 146 may extend substantially perpendicular to the rear plate 144 and substantially parallel to the top plate 142.

Each of the mounting brackets 170 may define a biasing member, such as a tab 184. The tab 184 may extend from a lower edge (e.g., distal from the release button 172) of the respective mounting bracket 170. The tab 184 may be configured to engage the lower lip 146 of the cover 140 to bias the respective mounting bracket 170 toward the top plate 142 of the cover 140. For example, the mounting bracket 170 may be justified upwards via bending of the tab 184. The tab 184 bending may allow the height of the mounting bracket 170 to match the height of the cover 140, for example, regardless of known tolerances. The tab 184 biasing the respective mounting bracket 170 toward the top plate 142 may removably attach the respective mounting bracket 170 to the cover 140. The top plate 142 may define a plurality of ribs 143 that extend from an inner surface 152 of the top plate 142. The plurality of ribs 143 may extend substantially in respective planes that are parallel to a plane the rear plate 144. The tab 184 may be configured to wedge the respective mounting bracket 170 between the lower lip 146 and the top plate 142 (e.g., one or more of the plurality of ribs 143), for example, such that the respective mounting bracket 170 is removably attached to the cover 140 without the use of fasteners. For example, an upper surface 184 of the respective mounting bracket 170 may abut one or more of the plurality of ribs 143 when the mounting bracket 170 is removably attached to the cover 140. When each of the mounting brackets 170 are wedged between the lower lip 146 and the top plate 142, an installer may secure the respective mounting brackets 170 to the structure using fasteners that extend through the cover 140 (e.g., the rear plate 144 and/or the top plate 142). For example, each of the mounting brackets 170 may be configured to receive one or more fasteners (not shown) that extend through the cover 140 and into the structure for mounting the battery-powered motorized window treatment 110 to the structure when the respective mounting bracket 170 is removably attached to the cover 140. The tab 184 may be configured to provide for easy installation by temporarily securing the respective mounting bracket 170 to the cover 140 such that the installer does not have to hold the respective mounting bracket 170 in place while driving the fasteners through the respective mounting bracket 170 and cover 140 into the structure.

The headrail 114 may remain attached to the mounting brackets 170 when the battery-powered motorized window treatment 110 (e.g., the headrail 114) is in the service position. For example, the mounting brackets 170 may support the headrail 114 while the battery-powered motorized window treatment 110 is in the service position. The mounting brackets 170 may remain coupled to the cover 140 when the battery-powered motorized window treatment 110 is in the service position.

The gap 155 between the cover 140 (e.g., the front lip 141) and the headrail 114 (e.g., the front portion 117) may define a width D1 that is substantially constant along a length of the battery-powered motorized window treatment 110 (e.g., the headrail 114). For example, the tab 184 biasing the mounting bracket 170 toward the top plate 142 may maintain the width D1 of the gap 155 substantially constant along the length (e.g., the entire length) of the shade assembly 115 and/or headrail 114, which may improve the aesthetic appearance of the battery-powered motorized window treatment 110.

The cover 140 may be configured to enclose at least a portion of the upper portion of the headrail 114 and at least a portion of a rear surface 124 of the headrail 114 as well as the mounting brackets 170 (e.g., to improve the aesthetic appearance of the battery-powered motorized window treatment 110). The top plate 142 may be configured to cover an upper surface 168 of the mounting brackets 170. The cover 140 may define a notch 148. The notch 148 may extend across a portion of the top plate 142 and the rear plate 144. The cover 140 may comprise a non-metallic plate 150 that is configured to be secured within the notch 148. For example, the non-metallic plate 150 may cover the notch 148 when secured to the top plate 142 and/or the rear plate 144. The metallic portion of the cover 140 may prevent radio-frequency (RF) signals (e.g., carrying messages) from being communicated therethrough. The non-metallic plate 150 may be configured to enable RF signals to be transmitted and/or received therethrough by a wireless communication circuit of the motor drive unit 120 (e.g., such as a communication circuit 225 shown in FIG. 10) of the battery-powered motorized window treatment 110. The messages received via the RF signals may include one or more commands for controlling the motor drive unit 120 of the battery-powered motorized window treatment 110. Although the notch 148 and non-metallic plate 150 are shown extending across the top plate 142 and the rear plate 144, it should be appreciated that the notch 148 and non-metallic plate 150 are not limited to the geometry shown. For example, the notch 148 and non-metallic plate 150 may alternatively extend only along the top plate 142 or only along the rear plate 144. The cover 140 may prevent dust and debris from entering the headrail 114 which may adversely impact operation of the components housed therein.

Figure 8B:
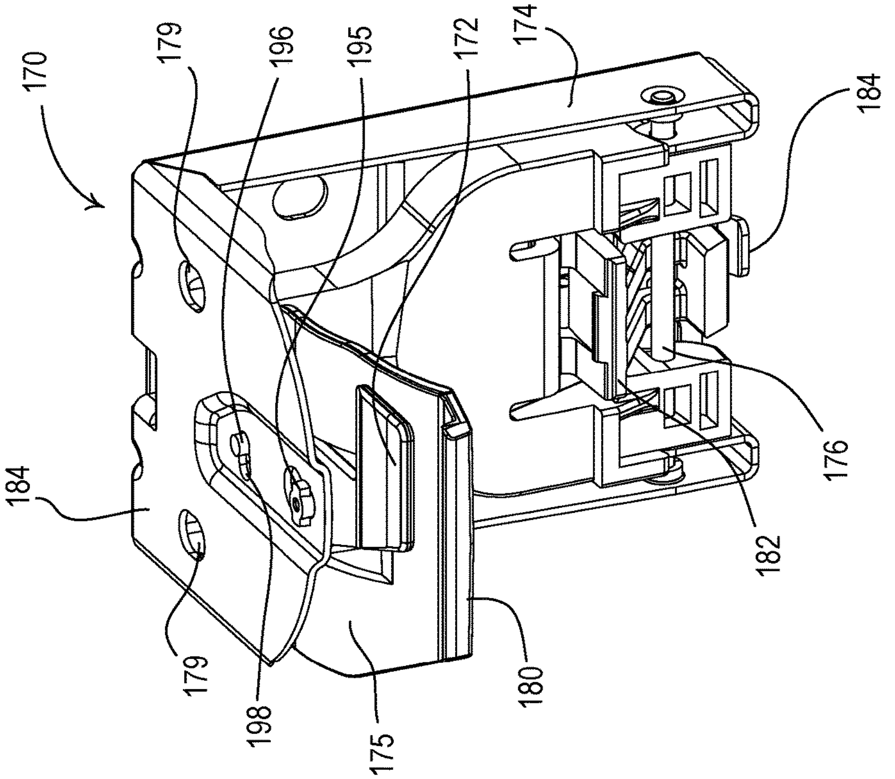
FIGS. 8A and 8B are perspective views of the mounting bracket of the battery-powered motorized window treatment of FIG. 1 shown in a locked position.
Figure 8A:
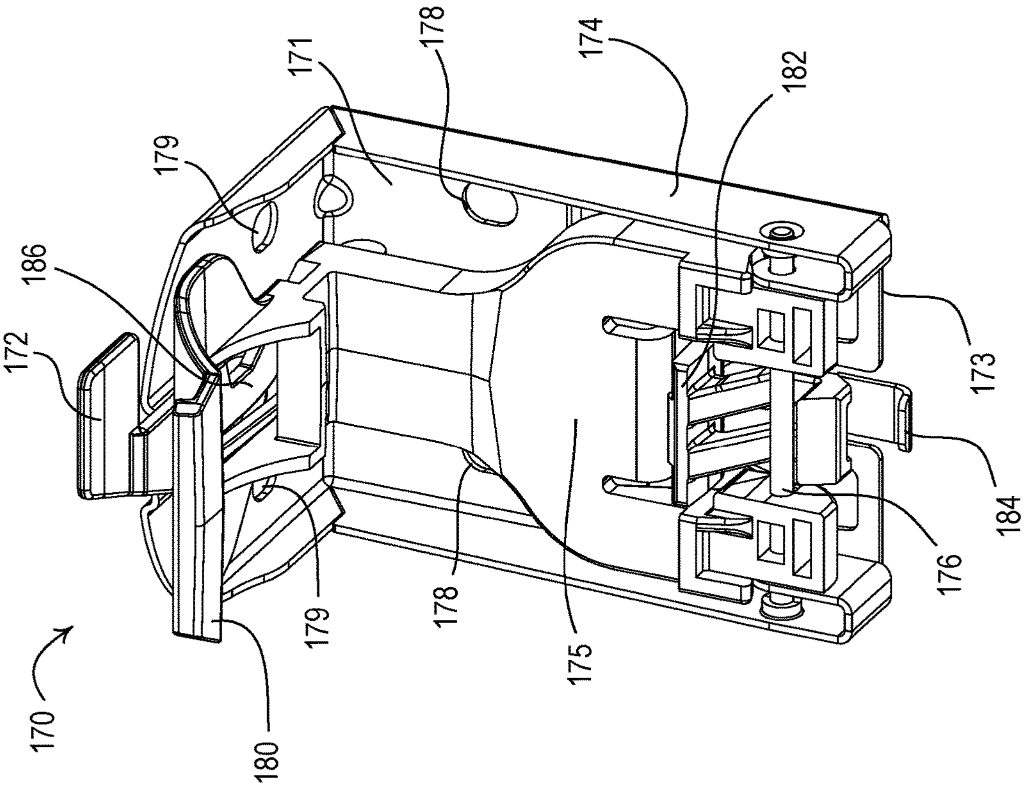
Figure 8D:
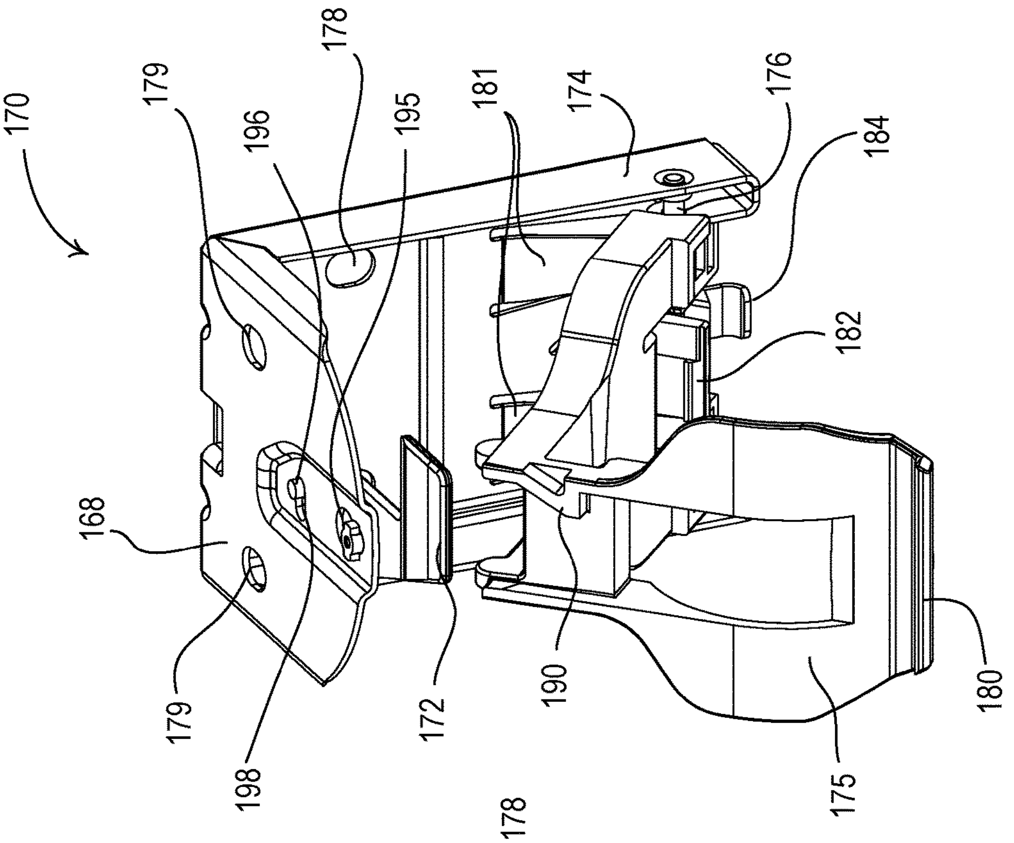
FIGS. 8C and 8D are perspective views of the mounting bracket of the battery-powered motorized window treatment of FIG. 1 shown in an open position.
Figure 8C:
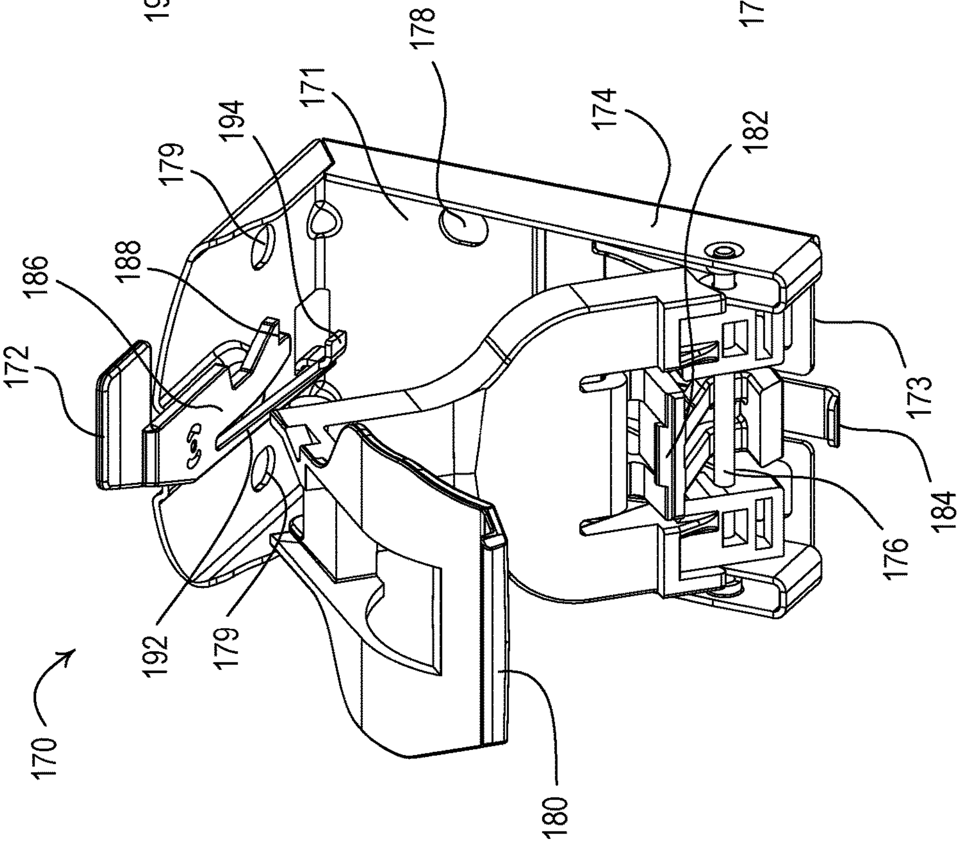
Figure 8F:
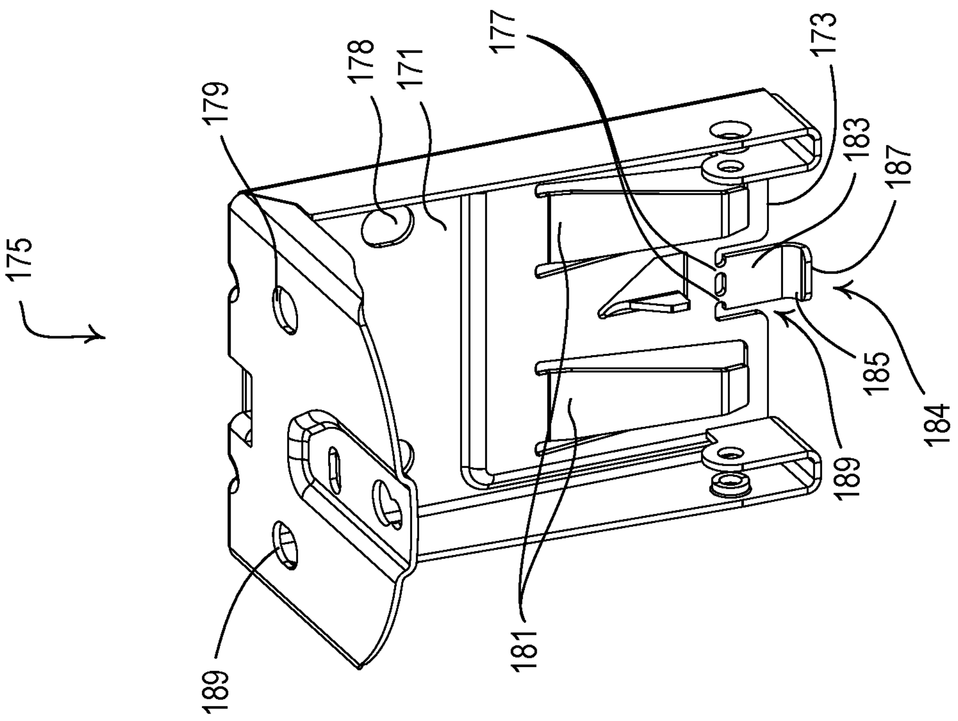
FIGS. 8E and 8F are perspective views of the mounting bracket of the battery-powered motorized window treatment of FIG. 1 shown with a rotating portion removed.
Figure 8E:
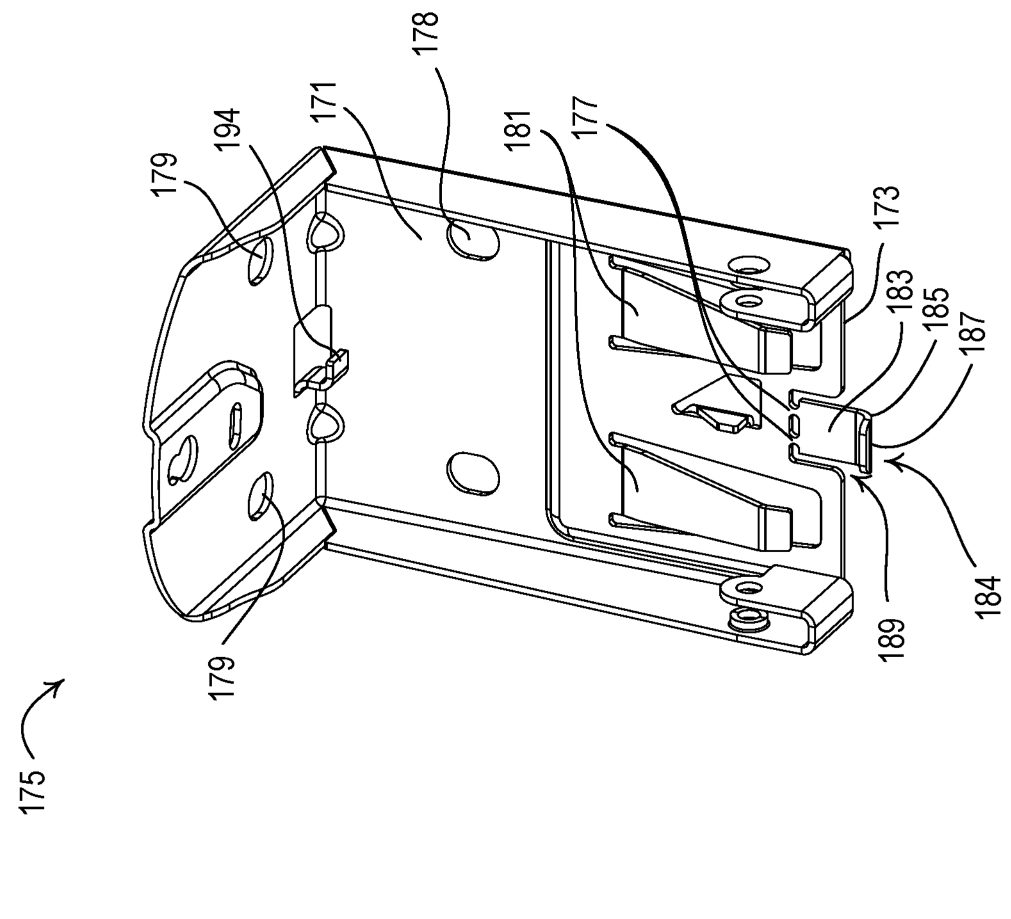

FIGS. 8A and 8B are perspective views of the mounting bracket 170 shown in a locked position. FIGS. 8C and 8D are perspective views of the mounting bracket 170 shown in a service position. FIGS. 8E and 8F are perspective views of a mounting portion 174 of the mounting bracket 170. The mounting bracket 170 may comprise the release button 172 that may be pushed to release the headrail 114 from the locked position, such that the headrail 114 may be rotated into the service position and the batteries 138 may be accessed. The release button 172 may be configured to be located above the headrail 114. For example, the release button 172 may extend through the gap 155 defined between the headrail 114 (e.g., the top plate 142) and the cover 140. The headrail 114 may be flexible enough, such that the release buttons 172 of the mounting brackets 170 may be actuated one at a time in order to release the headrail 114 from the locked position. Accordingly, the battery-powered motorized window treatment 110 may be released from the locked position to enter the service position without the use of tools. Alternatively, the release buttons 172 may be implemented as pull-tabs or the battery-powered motorized window treatment 110 could comprise latches that require tools to be unlatched.

The mounting bracket 170 may comprise the mounting portion 174 and a rotating portion 175 that is rotatably coupled to the mounting portion 174 via an axle 176 (e.g., an axle rod). The mounting portion 174 may be configured to be coupled to the cover 140 for securing the motorized window treatment 110 to the structure. For example, the mounting potion 174 may be mounted to a vertical surface or a horizontal surface via fasteners (not shown) received through vertical mounting holes 178 or horizontal mounting holes 179, respectively. The rotating portion 174 may comprise a lip 180 and a clip 182 for connecting to the headrail 114 of the motorized window treatment 110. The lip 180 may be an upper lip that is configured to engage an upper portion of the headrail 114. For example, an internal portion of the headrail 114 may be adapted to rest on the lip 180. The clip 182 may be configured to engage a lower portion of the headrail 114 such that the shade assembly 115 is removably attached to the mounting bracket 170. For example, the lower portion of the headrail 114 may be adapted to snap into the clip 182. The release buttons 172 may be configured to be operated to pivot the rotating portion 174 from the locked position when the shade assembly 115 is in the operating position to the open position when the shade assembly 115 is in the service position. When a user operates the release button 172, the rotating portion 174 may pivot about the axle rod 176 thus rotating the top of the headrail 114 towards the user into the service position, such that the batteries 138 may be accessed.

The mounting portion 174 may comprise the tab 184. The tab 184 may extend from a lower portion of the mounting portion 174. The mounting portion 174 may comprise a rear sheet 171. The rear sheet 171 may define a lower edge 173. At least a portion of the tab 184 may extend beyond the lower edge 173 of the mounting portion 174. The tab 184 may extend from the rear sheet 171, for example, via a pair of links 177. The links 177 may be configured to connect the tab 184 to the rear sheet 171. The links 177 may enable the tab 184 to flex with respect to the rear sheet 171 (e.g., as shown in FIG. 7), for example, such that the mounting bracket 170 is biasable toward the top plate 142 of the cover 140. Although the figures show a pair of links 177 connecting the tab 184 to the rear sheet 171, it should be appreciated that any number of links 177 may be used to connect the tab 184 to the rear sheet 171.

The tab 184 may define an arm 183 that extends from the rear sheet 171. For example, the arm 183 may extend from the links 177. The arm 183 may be substantially parallel to the rear sheet 171. The tab 184 may define a tip 187 that is configured to abut the lower lip 146 of the cover 140. For example, the tab 184 may be configured to engage the lower lip 146 of the cover 140 to bias the mounting bracket 170 against the top plate 142 of the cover 140. The width D1 of the gap 155 may be maintained substantially constant along a length of the shade assembly 115 by the tab 184 biasing the mounting bracket 170 against the top plate 142. The tip 187 may be configured to be substantially parallel to the lower lip 146, for example, when the tab 184 is bent and the tip 187 abuts the lower lip 146. The tab 184 may define a curved portion 185 that is curved away from a plane defined by the rear sheet 171. For example, the curved portion 185 may curve toward the direction that the upper surface 168 of the mounting bracket 170 extends. The tip 187 may define a substantially horizontal portion (e.g., a contact portion) that is substantially perpendicular to the rear sheet 171. The mounting portion 174 may define slots 189 on opposed sides of the tab 184 (e.g., the arm 183). For example, the slots 189 may extend between the tab 184 (e.g., the arm 183) and the rear sheet 171. The slots 189 may enable relative movement of the tab 184 with respect to the rear sheet 171.

The mounting portion 174 may comprise two spring arms 181 that contact the rotating portion 175. The spring arms 181 may contact the rotating portion 175 to provide a controlled movement of the motorized window treatment 110 (e.g., the shade assembly 115) when the headrail 114 is released from the locked position and the rotating portion rotates about the axle rod 176 into the service position. Alternatively, the rotating portion 175 may comprise one or more spring arms for contacting the mounting portion 174, for example, to provide a controlled movement of the motorized window treatment 110 (e.g., the shade assembly 115) when the headrail 114 is released from the locked position.

The mounting bracket 170 may further comprise a latch 186 that locks the rotating portion 175 in the locked position, and releases the rotating portion 175 to allow the headrail 114 to move into the service position in response to an actuation of the release button 172. The latch 186 may comprise a notch 188 and an elongated spring member 192 adapted to push against a tab 194 of the mounting portion 174 to hold the notch 188 against a locking surface 190 of the rotating portion 175 to thus hold the rotating portion 175 in the locked position. For example, the elongated spring member 192 may be configured to engage the tab 194 when the rotating portion is in the locked position. When the release button 172 is pushed towards the rear plate 144, the latch 186 may rotate about a rivet 195, a pin 196 travels through a channel 198 to guide the movement of the latch 186, and the spring member 192 flexes against the tab 194. Accordingly, the notch 188 of the latch mechanism 186 may no longer contact the locking surface 190 of the rotating portion 175, such that the rotating portion 175 and the headrail 114 are able to rotate freely about the axle rod 176. When the shade assembly 115 is operated from the service position to the operating position, the rotating portion 174 may pivot about the axle rod 176 until the latch 186 (e.g., the elongated spring member 192) presses against the tab 194 of the mounting portion 174 to hold the notch 188 against the locking surface 190 of the rotating portion 175.

Figure 9B:
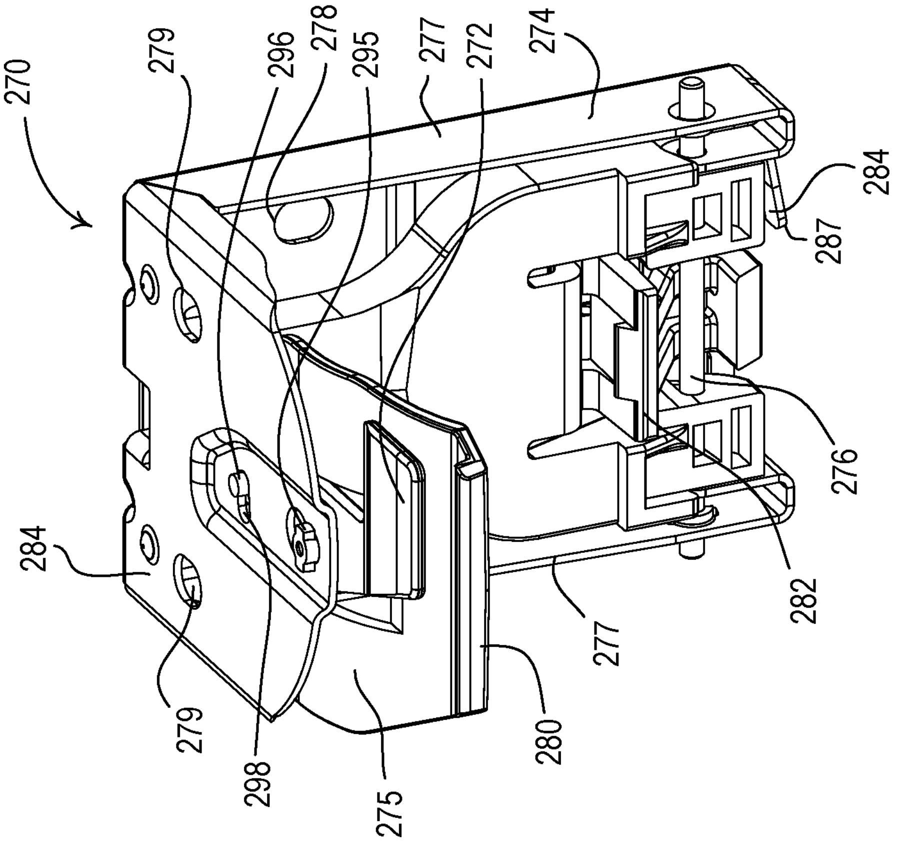
FIGS. 9A and 9B are perspective views of another mounting bracket for use with the battery-powered motorized window treatment of FIG. 1, where the mounting bracket is shown in a locked position.
Figure 9A:
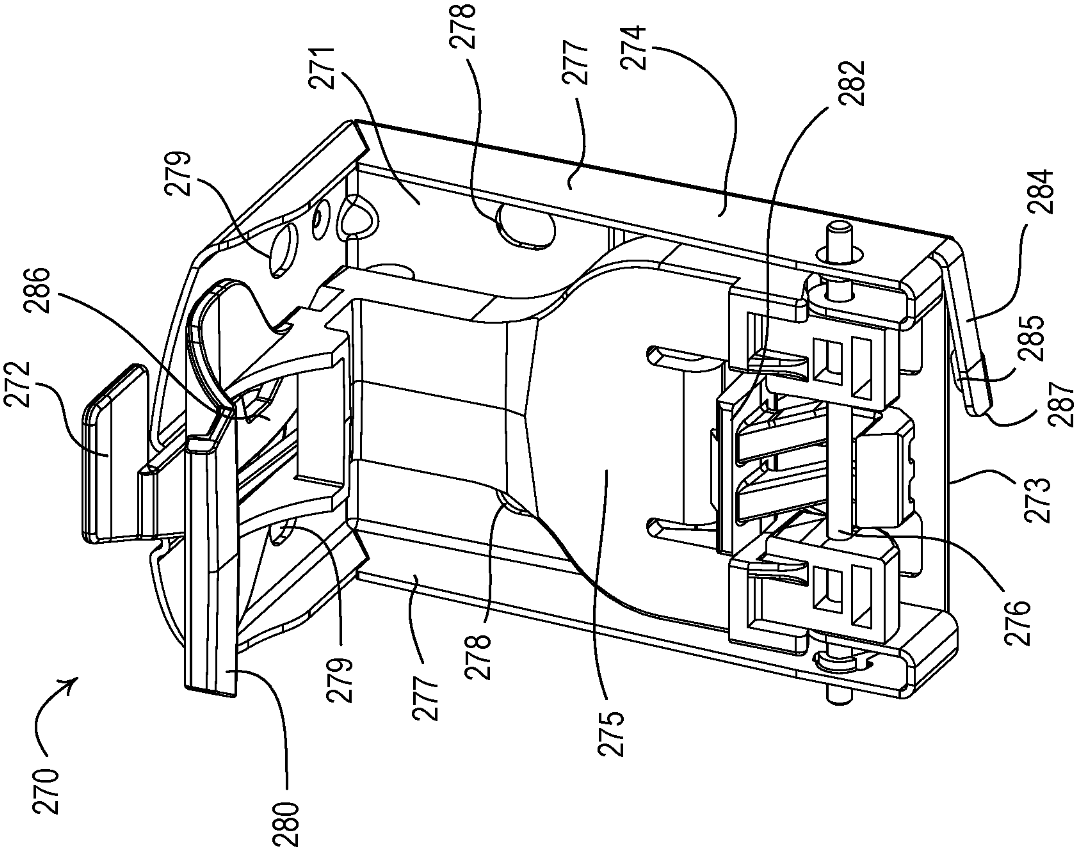
Figure 9D:
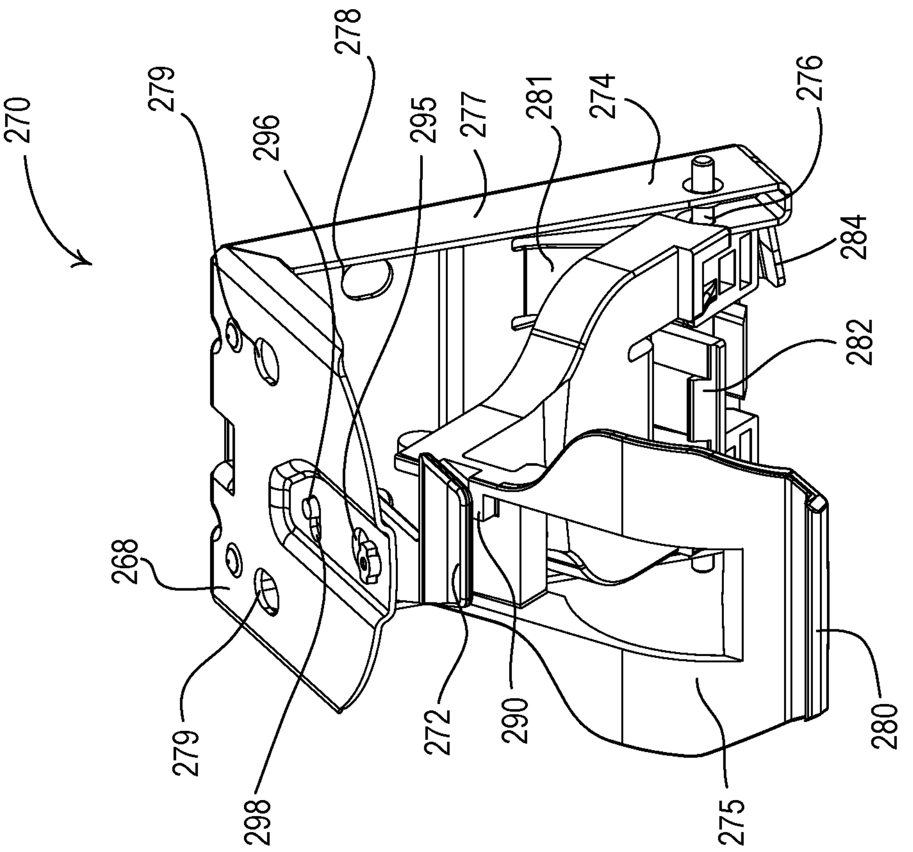
FIGS. 9C and 9D are perspective views of the mounting bracket of FIGS. 9A and 9B shown in an open position.
Figure 9C:
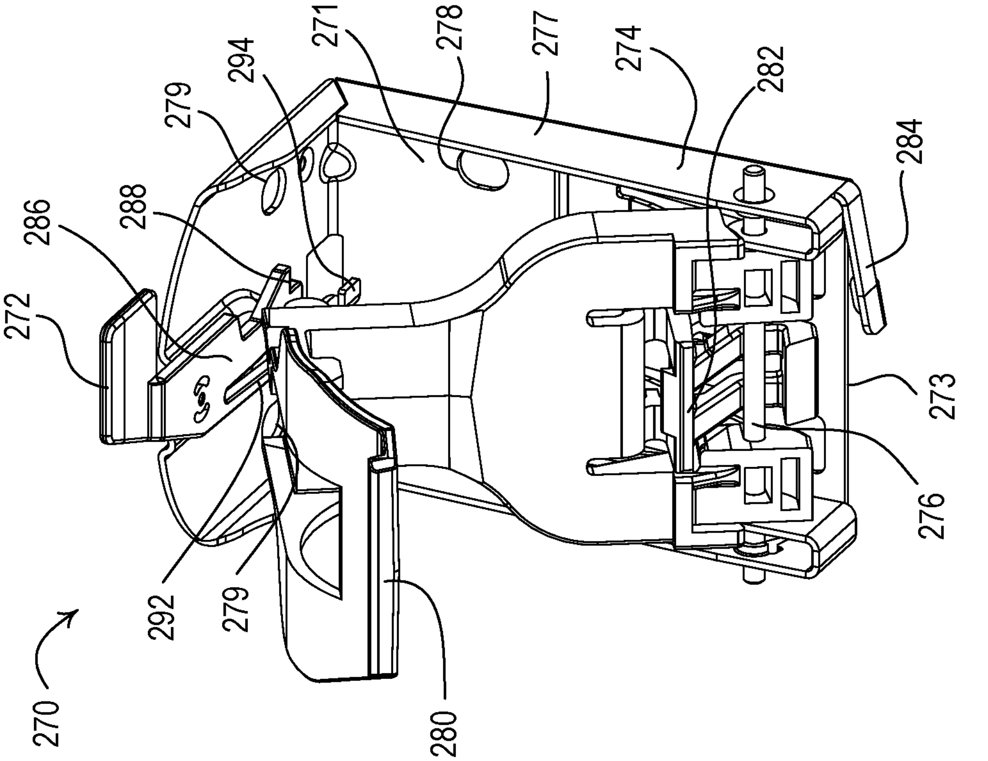
Figure 9F:
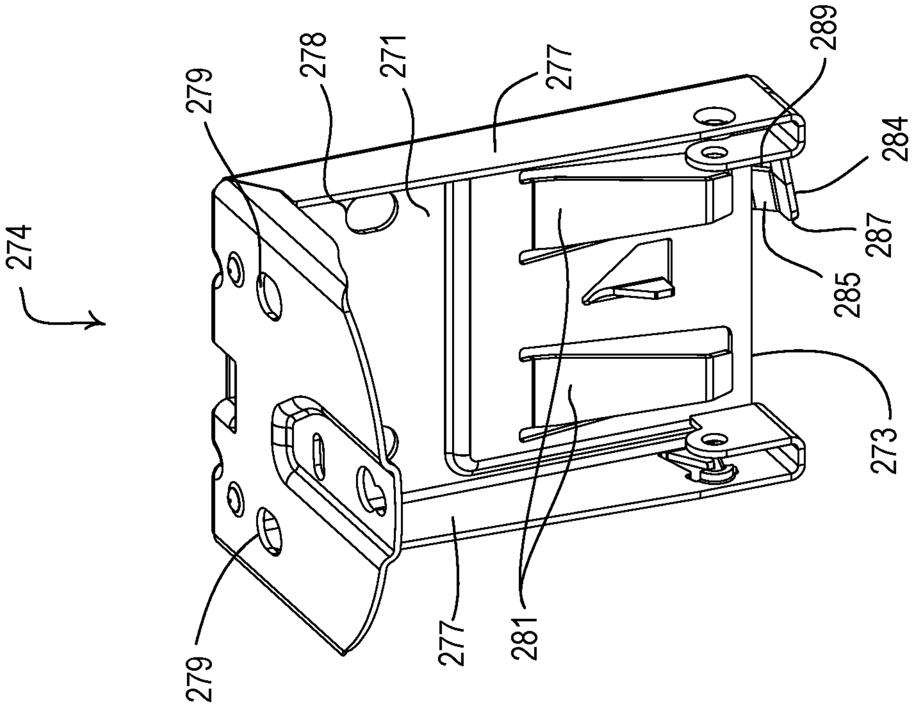
FIGS. 9E and 9F are perspective views of the mounting bracket of FIGS. 9A and 9B shown with a rotating portion removed.
Figure 9E:
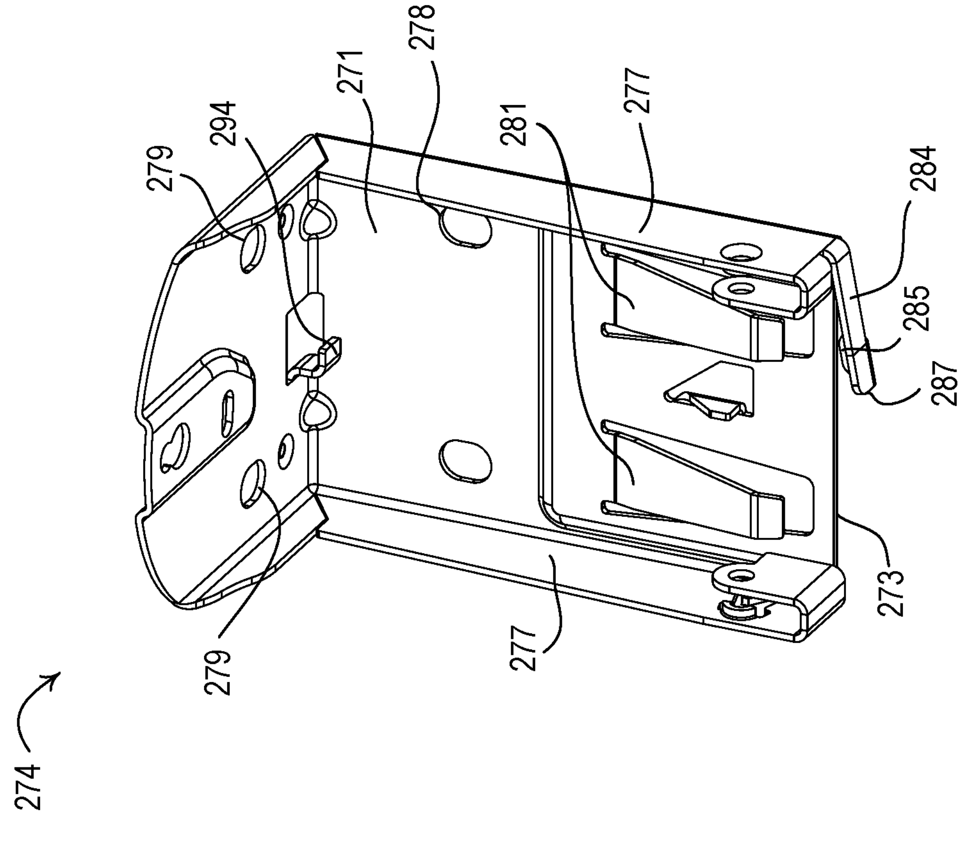

FIGS. 9A-9F illustrate another mounting bracket 270 that may be deployed as the mounting brackets 170 of the mounting assembly 165 of the battery-powered motorized window treatment 110 shown in FIGS. 1-7. FIGS. 9A and 9B are perspective views of the mounting bracket 270 shown in a locked position. FIGS. 9C and 9D are perspective views of the mounting bracket 270 shown in a service position. FIGS. 9E and 9F are perspective views of a mounting portion 274 of the mounting bracket 270. The mounting bracket 270 may comprise a release button 272 that may be pushed to release the headrail 114 from the locked position, such that the headrail 114 of the motorized window treatment 110 may be rotated into the service position and the batteries 138 may be accessed. The release button 272 may be configured to be located above the headrail 114. For example, the release button 172 may extend through the gap 155 defined between the headrail 114 (e.g., the top plate 142) and the cover 140. The headrail 114 may be flexible enough, such that the release buttons 272 of the mounting brackets 270 may be actuated one at a time in order to release the headrail 114 from the locked position. Accordingly, the battery-powered motorized window treatment 110 may be released from the locked position to enter the service position without the use of tools. Alternatively, the release buttons 272 may be implemented as pull-tabs or the battery-powered motorized window treatment 110 could comprise latches that require tools to be unlatched.

The mounting bracket 270 may comprise the mounting portion 274 and a rotating portion 275 that is rotatably coupled to the mounting portion 274 via an axle 276 (e.g., an axle rod). The mounting portion 274 may be configured to be coupled to the cover 140 for securing the motorized window treatment 110 to the structure. For example, the mounting potion 274 may be mounted to a vertical surface or a horizontal surface via fasteners (not shown) received through vertical mounting holes 278 or horizontal mounting holes 279, respectively. The rotating portion 274 may comprise a lip 280 and a clip 282 for connecting to the headrail 114 of the motorized window treatment 110. The lip 280 may be an upper lip that is configured to engage an upper portion of the headrail 114. For example, an internal portion of the headrail 114 may be adapted to rest on the lip 280. The clip 282 may be configured to engage a lower portion of the headrail 114 such that the shade assembly 115 is removably attached to the mounting bracket 270. For example, the lower portion of the headrail 114 may be adapted to snap into the clip 282. The release buttons 272 may be configured to be operated to pivot the rotating portion 274 from the locked position when the shade assembly 115 is in the operating position to the open position when the shade assembly 115 is in the service position. When a user operates the release button 272, the rotating portion 274 may pivot about the axle rod 276 thus rotating the top of the headrail 114 towards the user into the service position, such that the batteries 138 may be accessed.

The mounting portion 274 may comprise a biasing member, such as an arm 284. The arm 284 may extend from a lower portion of the mounting portion 274. The mounting portion 274 may comprise a rear sheet 271 and sidewalls 277. For example, the sidewalls 277 may extend on opposed sides of the rear sheet 271. The rear sheet 271 may define a lower edge 273. At least a portion of the arm 284 may extend beyond the lower edge 273 of the mounting portion 274. The arm 284 may extend from one of the sidewalls 277 of the mounting portion 274, for example, proximate to the lower edge 273. The arm 284 may be configured to flex with respect to the rear sheet 271, for example, such that the mounting bracket 270 is biasable toward the top plate 142 of the cover 140. For example, the arm 284 may be cantilevered from one of the sidewalls 277 of the mounting portion 274.

The arm 284 may define a tip 287 that is configured to abut the lower lip 146 of the cover 140. For example, the arm 284 may be configured to engage the lower lip 146 of the cover 140 to bias the mounting bracket 270 against the top plate 142 of the cover 140. The width D1 of the gap 155 may be maintained substantially constant along a length of the shade assembly 115 by the arm 284 biasing the mounting bracket 270 against the top plate 142. The arm 284 may define a tab 285 extending from a rear surface of the arm 284 adjacent to the tip 287. The tab 285 may defined a slanted portion 289 configured to facilitate installation of the mounting bracket 270 into the cover 140. The slanted portion 289 may be slanted (e.g., slanted upward) toward the rear sheet 271 from a plane defined by the arm 284. For example, the slanted portion 289 may be configured to contact the lower lip 146 of the cover 140 to cause the arm 284 to flex towards the rear sheet 271 of the mounting portion 274 as the mounting bracket 270 is installed in the cover 140.

The mounting portion 274 may comprise two spring arms 281 that contact the rotating portion 275. The spring arms 281 may contact the rotating portion 275 to provide a controlled movement of the motorized window treatment 110 (e.g., the shade assembly 115) when the headrail 114 is released from the locked position and the rotating portion rotates about the axle rod 176 into the service position. Alternatively, the rotating portion 275 may comprise one or more spring arms for contacting the mounting portion 174, for example, to provide a controlled movement of the motorized window treatment 110 (e.g., the shade assembly 115) when the headrail 114 is released from the locked position.

The mounting bracket 270 may further comprise a latch 286 that locks the rotating portion 275 in the locked position, and releases the rotating portion 275 to allow the headrail 114 to move into the service position in response to an actuation of the release button 272. The latch 286 may comprise a notch 288 and an elongated spring member 292 adapted to push against a tab 294 of the mounting portion 274 to hold the notch 288 against a locking surface 290 of the rotating portion 275 to thus hold the rotating portion 275 in the locked position. For example, the elongated spring member 292 may be configured to engage the tab 294 when the rotating portion is in the locked position. When the release button 272 is pushed towards the rear plate 144, the latch 286 may rotate about a rivet 295, a pin 296 travels through a channel 298 to guide the movement of the latch 286, and the spring member 292 flexes against the tab 294. Accordingly, the notch 288 of the latch mechanism 286 may no longer contact the locking surface 290 of the rotating portion 275, such that the rotating portion 275 and the headrail 114 are able to rotate freely about the axle rod 276. When the shade assembly 115 is operated from the service position to the operating position, the rotating portion 274 may pivot about the axle rod 276 until the latch 286 (e.g., the elongated spring member 292) presses against the tab 294 of the mounting portion 274 to hold the notch 288 against the locking surface 290 of the rotating portion 275.

Figure 10:
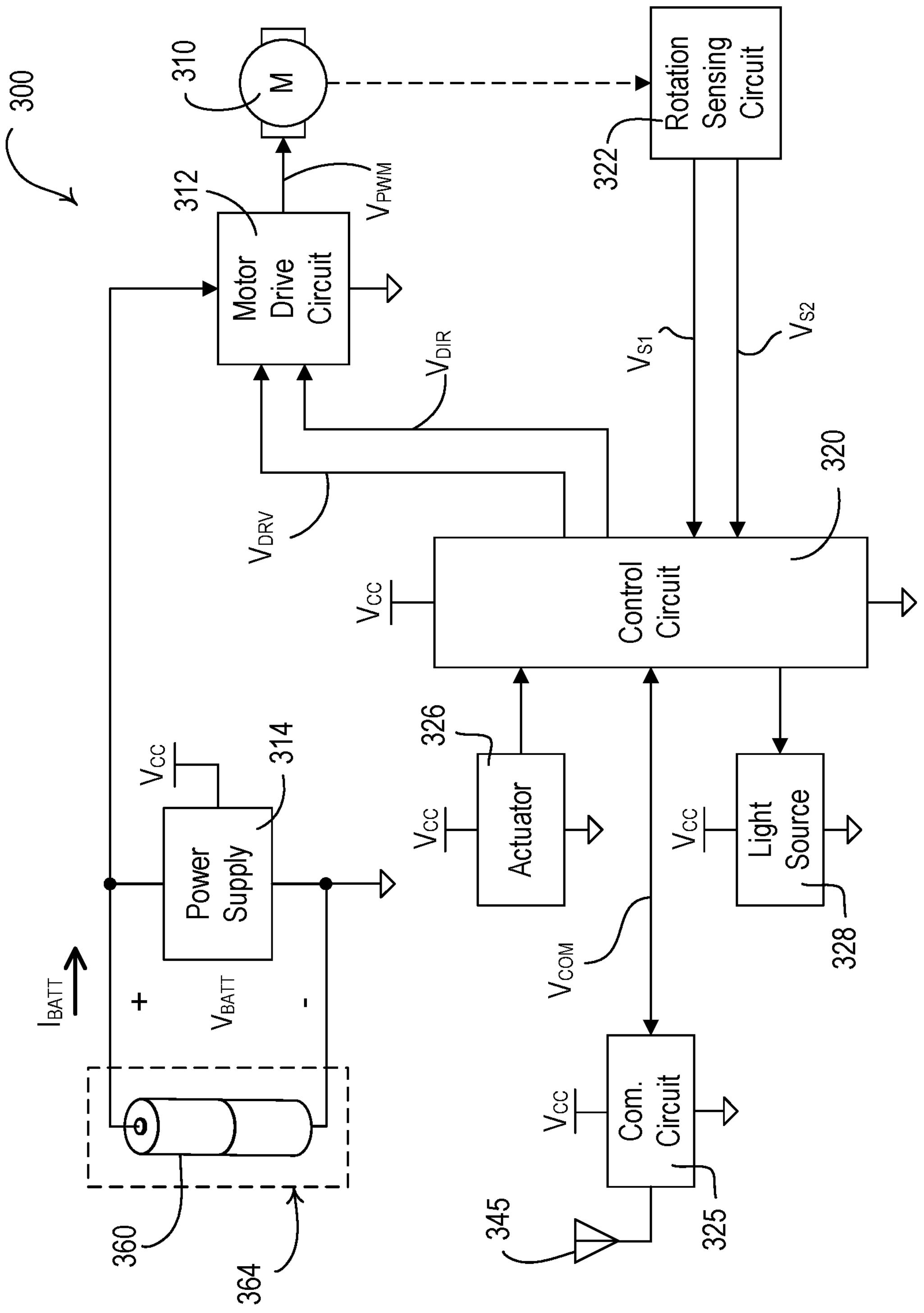
FIG. 10 is a simplified block diagram of a motor drive unit of a battery-powered motorized window treatment.

FIG. 10 is a simplified block diagram of a motor drive unit 300 of a battery-powered motorized window treatment (e.g., the motor drive unit 120 of the battery-powered motorized window treatment 110). The motor drive unit 300 may include a motor 310 (e.g., a direct-current motor) that may be coupled to a drive shaft having one or more lift cord spools (e.g., such as the lift cord spools 134 shown in FIG. 4) of the battery-powered motorized window treatment for raising and lowering a covering material (e.g., the covering material 112). The motor drive unit 300 may include a motor drive circuit 312 (e.g., an H-bridge drive circuit) that receives a bus voltage $V_{BUS}$ and may generate a pulse-width modulated (PWM) voltage for driving the motor 310. The bus voltage $V_{BUS}$ may be produced across a bus capacitor $C_{BUS}$. The motor drive unit 300 may include a power supply 314 that may receive the bus voltage $V_{BUS}$ and generates a supply voltage $V_{CC}$ for powering the low-voltage circuitry of the motor drive unit. The motor drive unit 300 may be configured to receive an input voltage $V_{IN}$ from, for example, an external power supply, such as a direct-current (DC) supply and/or an alternating-current (AC) supply. Additionally or alternatively, the motor drive unit 300 may be powered by one or more batteries and/or a photovoltaic power source, such as a solar cell.

The motor drive unit 300 may include a control circuit 320 for controlling the operation of the motor 310. The control circuit 320 may include, for example, a microprocessor, a programmable logic device (PLD), a microcontroller, an application specific integrated circuit (ASIC), a field-programmable gate array (FPGA), or any suitable processing device or control circuit. The control circuit 320 may be configured to generate one or more drive signals $V_{DR}$ for controlling the motor drive circuit 312. The one or more drive signals $V_{DR}$ may be configured to control the rotational speed and/or direction of rotation of the motor 310.

The motor drive unit 300 may include a rotational position sensor, such as, for example, a Hall effect sensor (HES) circuit 322, which may be configured to generate one or more Hall effect sensor signals $V_{S1}$, $V_{S2}$. The one or more Hall effect sensor signals $V_{S1}$, $V_{S2}$ may indicate a rotational speed and/or a direction of the motor 310 to the microcontroller. The rotational position sensor may include other suitable position sensors, such as, for example, magnetic, optical, and/or resistive sensors. The control circuit 320 may be configured to determine a rotational position of the motor 310 (e.g., and lift cord spools 134) in response to the Hall effect sensor signals $V_{S1}$, $V_{S2}$ generated by the HES circuit 322. The control circuit 320 may be configured to determine a present position of the covering material (e.g., bottom bar such as the bottom bar 116 shown in FIGS. 1-5) in response to the rotational position of the motor 310 and/or lift cord spools (e.g., such as the lift cord spools 134 shown in FIG. 4). The control circuit 320 may be coupled to a memory 324 (e.g., a non-volatile memory). The present position of the covering material and/or limits for controlling the position of the covering material (e.g., a fully open position and/or a fully closed position) may be stored in the memory 324. The operation of a motor drive circuit and a Hall effect sensor circuit of an example motor drive unit is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 7,839,109, issued Nov. 23, 2010, entitled METHOD OF CONTROLLING A MOTORIZED WINDOW TREATMENT, the entire disclosures of which are hereby incorporated by reference.

The motor drive unit 300 may include a communication circuit 325 that may allow the control circuit 320 to transmit and receive communication signals, e.g., wired communication signals and/or wireless communication signals, such as radio-frequency (RF) signals. For example, the communication circuit 325 may be a wireless communication circuit that is electrically coupled to an antenna 345 for transmitting and/or receiving the communication signals. The control circuit 320 may be configured to control the motor 310 to control the movement of the covering material in response to a shade movement command received from the communication signals received via the communication circuit 325. The motor drive unit 300 may also include an actuator 326 (e.g., a mechanical tactile switch) that may be actuated in response to actuations of a button (e.g., the drive unit button 126 of the motor drive unit 120). For example, the control circuit 320 may be responsive to actuations of the actuator 326 during configuration of the motor drive unit 300. The motor drive unit 300 may include a light source 328 (e.g., one or more light-emitting diodes (LEDs)) that may be controlled by the control circuit 320, for example, to illuminate an indicator (e.g., the drive unit button 126 of the motor drive unit 120) to provide feedback to the user of the battery-powered motorized window treatment.

The motor drive unit 300 may comprise a compartment 364 (e.g., which may be an example of one of the battery holders 139 of the battery-powered motorized window treatment 110 shown in FIG. 4) that is configured to receive a DC power source. The DC power source may be one or more batteries 360. In addition, alternate DC power sources, such as a solar cell (e.g., a photovoltaic cell), an ultrasonic energy source, and/or a radio-frequency (RF) energy source, may be coupled in parallel with the one or more batteries 360, or in some examples be used as an alternative to the batteries 360. The alternate DC power source may be used to perform the same and/or similar functions as the one or more batteries 360. In this example, the compartment 364 may be configured to receive one or more batteries 360 (e.g., four "D" batteries), such as the batteries 138 shown in FIG. 4. The batteries 360 may provide a battery voltage $V_{BATT}$ to the motor drive unit 300.

While the present disclosure has been described with reference to the battery-powered motorized window treatment 110 having the covering material 112, the concepts of the present invention could be applied to other types of motorized window treatments, such as, for example, Roman shades and Venetian blinds. An example of a Roman shade system is described in greater detail in commonly-assigned U.S. Patent Application Publication No. 2010/0294438, published Nov. 25, 2010, entitled ROMAN SHADE SYSTEM, the entire disclosure of which is hereby incorporated by reference. An example of a Venetian blind system is described in greater detail in commonly-assigned U.S. Patent Application Publication No. 2012/0125543, published May 24, 2012, entitled MOTORIZED VENETIAN BLIND SYSTEM, the entire disclosure of which is hereby incorporated by reference.

What is claimed is:

1. A motorized window treatment comprising:

a covering material;

a motor drive unit adapted to control the covering material between a fully-raised position and a fully-lowered position;

a headrail configured to enclose the motor drive unit, wherein the covering material is configured to descend from the headrail when operated from the fully-raised position to the fully-lowered position, the headrail comprising a battery holder for receiving at least one battery for powering the motor drive unit;

a cover that is elongate between a first end of the headrail and a second end of the headrail, the cover comprising a rear plate and a top plate extending substantially perpendicular to the rear plate, the cover configured to enclose at least an upper portion and a rear portion of the headrail; and a mounting bracket configured to secure the motorized window treatment to a structure, the mounting bracket defining an upper surface and a rear sheet that extends from the upper surface, the mounting bracket comprising:

a biasing member that engages a lower lip of the cover to bias the mounting bracket toward the top plate of the cover, wherein at least a portion of the biasing member extends beyond a lower edge of the mounting bracket in a direction that the rear sheet of the mounting bracket extends away from the upper surface of the mounting bracket; and a release button configured to extend through a gap between the headrail and the top plate of the cover when the motorized window treatment is in an operating position, the release button configured to be operated to adjust the motorized window treatment into a service position in which access is provided to the at least one battery, the mounting bracket remaining coupled to the cover and the headrail remaining attached to the mounting bracket when the motorized window treatment is in the service position.

2. The motorized window treatment of claim 1, wherein the top plate is configured to extend over the upper portion of the headrail when the headrail is attached to the mounting bracket.

3. The motorized window treatment of claim 2, wherein the cover is metallic, and wherein the cover defines a notch, the cover comprising a non-metallic plate that is configured to be secured within the notch.

4. The motorized window treatment of claim 3, wherein the notch and non-metallic plate are configured to enable wireless messages to be received by the motorized window treatment.

5. The motorized window treatment of claim 4, further comprising a wireless communication circuit configured to receive the wireless messages that include one or more commands for controlling the motorized window treatment.

6. The motorized window treatment of claim 1, wherein a width of the gap is maintained substantially constant along a length of the motorized window treatment by the biasing member biasing the mounting bracket against the top plate.

7. The motorized window treatment of claim 1, wherein the top plate comprises a plurality of ribs extending from an inner surface of the top plate, the plurality of ribs extending substantially parallel to the rear plate.

8. The motorized window treatment of claim 7, wherein the biasing member is configured to wedge the mounting bracket between the lower lip and one or more of the plurality of ribs such that the mounting bracket is removably attached to the cover without the use of fasteners.

9. The motorized window treatment of claim 8, wherein the mounting bracket is configured to receive fasteners that extend through the cover and into the structure for mounting the motorized window treatment to the structure.

10. The motorized window treatment of claim 1, wherein the cover further comprises a front lip extending at an angle from the top plate.

11. The motorized window treatment of claim 10, wherein the gap is defined between a front portion of the headrail and the front lip.

12. The motorized window treatment of claim 1, wherein the release button is configured to be pushed towards the rear plate to release the motorized window treatment from the operating position.

13. The motorized window treatment of claim 1, comprising end covers that are configured to be removably attached to respective ends of the headrail.

14. The motorized window treatment of claim 1, wherein the biasing member comprises:
- an arm that extends from the rear sheet of the mounting bracket;
- a curved portion that is curved away from a plane defined by the rear sheet; and
- a tip that is configured to abut the lower lip of the cover.

15. The motorized window treatment of claim 14, wherein the mounting bracket further comprises a pair of links that connect the biasing member to the rear sheet.

16. The motorized window treatment of claim 14, wherein the mounting bracket further comprises slots on opposed sides of the biasing member, the slots configured to enable relative movement of the biasing member with respect to the rear sheet.

17. The motorized window treatment of claim 11, wherein the biasing member comprises:
- an arm that extends from a sidewall of the mounting bracket;
- a curved portion that is curved away from a plane defined by the rear sheet of the mounting bracket; and
- a tip that is configured to abut the lower lip of the cover.

18. The motorized window treatment of claim 17, wherein the arm is configured to flex with respect to the rear sheet.

19. The motorized window treatment of claim 17, wherein the arm defines a tab that extends from a rear surface of the arm, the tab may define a slanted portion that is configured to contact the lower lip of the cover as the mounting bracket is installed in the cover.

20. The motorized window treatment of claim 19, wherein the slanted portion is configured to cause the arm to flex towards the rear sheet as the mounting bracket is installed in the cover.

21. The motorized window treatment of claim 1, wherein the headrail comprises a front portion that is removably attachable thereto.

22. The motorized window treatment of claim 21, wherein the front portion comprises:
- an upper clip configured to engage an upper surface of the headrail; and
- an intermediate clip configured to engage a channel defined by the headrail.

23. The motorized window treatment of claim 22, wherein the upper clip and the intermediate clip are configured to resist a threshold force applied to the front portion in a direction away from the headrail.

24. The motorized window treatment of claim 22, wherein the intermediate clip has a T-shaped cross-section.

* * * * *